United States Patent
Gower et al.

(10) Patent No.: US 9,865,308 B2
(45) Date of Patent: Jan. 9, 2018

(54) PROVISION OF VIDEO DATA

(71) Applicant: BRITISH TELECOMMUNICATIONS PUBLIC LIMITED COMPANY, London (GB)

(72) Inventors: Andrew Peter Gower, London (GB); Stephen Howard Johnson, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 0 days.

(21) Appl. No.: 14/772,872

(22) PCT Filed: Jan. 31, 2014

(86) PCT No.: PCT/GB2014/000037
§ 371 (c)(1),
(2) Date: Sep. 4, 2015

(87) PCT Pub. No.: WO2014/135827
PCT Pub. Date: Sep. 12, 2014

(65) Prior Publication Data
US 2016/0005440 A1    Jan. 7, 2016

(30) Foreign Application Priority Data
Mar. 5, 2013 (EP) .................................. 13250026

(51) Int. Cl.
*G11B 27/34*       (2006.01)
*H04N 21/845*      (2011.01)
(Continued)

(52) U.S. Cl.
CPC ............ *G11B 27/34* (2013.01); *G11B 27/031* (2013.01); *G11B 27/22* (2013.01);
(Continued)

(58) Field of Classification Search
CPC ......... H04N 21/47217; H04N 21/8455; H04N 21/4782; H04N 21/8545; H04N 21/4821;
(Continued)

(56) References Cited

U.S. PATENT DOCUMENTS 7,831,112 B2   11/2010   Wang et al.
7,983,442 B2   7/2011    Chiang et al.
(Continued)

FOREIGN PATENT DOCUMENTS

EP   1421780      5/2004
EP   1 968 066    9/2008
(Continued)

OTHER PUBLICATIONS

Gower, et al. Office Action (7 pages) dated Jun. 10, 2016, issued in copending U.S. Appl. No. 14/772,635, filed Sep. 3, 2015.
(Continued)

*Primary Examiner* — Huy T Nguyen
(74) *Attorney, Agent, or Firm* — Nixon & Vanderhye PC

(57) ABSTRACT

Individual time stamp data inputs generated by different viewers of a broadcast or other video output are used to identify parts of the video data to be used to generate a sequence of video clips or "highlights". The individual time stamps for each event are aggregated to generate a single marker flag (93) for each event, defined for example as the median (95) (or some other point) in the distribution (90) of time stamps.

12 Claims, 6 Drawing Sheets

(51) Int. Cl.
*H04N 21/475* (2011.01)
*H04N 21/84* (2011.01)
*H04N 21/8549* (2011.01)
*G11B 27/031* (2006.01)
*G11B 27/22* (2006.01)
*G11B 27/30* (2006.01)

(52) U.S. Cl.
CPC ..... *G11B 27/3036* (2013.01); *H04N 21/4756* (2013.01); *H04N 21/84* (2013.01); *H04N 21/8456* (2013.01); *H04N 21/8549* (2013.01)

(58) Field of Classification Search
CPC ...... H04N 5/76; H04N 5/786; G06F 17/3002; G06F 17/30058; G06F 17/30817; G06F 17/3082; G06F 17/30843; G06F 17/30858
See application file for complete search history.

(56) References Cited

U.S. PATENT DOCUMENTS

| | | |
|---|---|---|
| 2002/0120925 A1 | 8/2002 | Logan |
| 2006/0221184 A1 | 10/2006 | Vallone et al. |
| 2006/0282859 A1 | 12/2006 | Garbow et al. |
| 2008/0052612 A1 | 2/2008 | Hwang et al. |
| 2009/0049118 A1* | 2/2009 | Stevens ............. G06F 17/30017 709/203 |
| 2011/0075990 A1* | 3/2011 | Eyer ........................ H04N 5/76 386/241 |
| 2011/0217024 A1 | 9/2011 | Schlieski |
| 2012/0263430 A1 | 10/2012 | Spitzer-Williams |
| 2012/0315014 A1* | 12/2012 | Shuster ............. G06F 17/30817 386/241 |
| 2013/0335554 A1* | 12/2013 | Brunner ................. G01C 21/16 348/135 |
| 2016/0014479 A1 | 1/2016 | Gower et al. |

FOREIGN PATENT DOCUMENTS

| | | |
|---|---|---|
| EP | 2 216 788 | 8/2010 |
| GB | 2 452 315 | 3/2009 |
| WO | WO 02/080027 | 10/2002 |
| WO | WO 2004/025508 | 3/2004 |
| WO | WO 2005/057931 | 6/2005 |
| WO | WO 2005/093638 | 10/2005 |

OTHER PUBLICATIONS

Gower et al, U.S. Appl. No. 14/772,635, filed Sep. 3, 2015 (WO 2014/135826).

International Search Report for PCT/GB2014/000037, dated Apr. 23, 2014, 3 pages.

U.S. Appl. No. 14/772,635, filed Sep. 3, 2015, Video Data Provision.

* cited by examiner

PROVISION OF VIDEO DATA

This application is the U.S. national phase of International Application No. PCT/GB2014/000037 filed 31 Jan. 2014, which designated the U.S. and claims priority to EP Patent Application No. 13250026.5 filed 5 Mar. 2013, the entire contents of each of which are hereby incorporated by reference.

TECHNICAL FIELD

This invention relates to the provision of video data over a communications medium. In particular it is relates to the identification of 'highlights' of a recorded programme, by applying "bookmark" data to the programme. These can be used by the user who created them, or other users, to identify the parts of greatest interest. They may be used, for example, to identify parts of the broadcast for compilation into a short video sequence. The provision of such highlights is an important part of many television services, particularly in sports coverage.

BACKGROUND AND SUMMARY

The extracts required to compile a sequence of "highlights" clips are typically created from within a longer video sequence using standard digital video editing tools that define the start and end points of each video clip either directly or by reference to a key event within the clip. Each clip is typically saved as an independent file which can subsequently be provided to viewers. Typically a viewer requesting a "highlights" sequence is provided with an address, or set of addresses, from which to retrieve the clips that make up the required sequence.

It is known, for example from International Patent Specification WO2004/025508 to provide an automated procedure to identify 'highlights' within a video sequence in order to provide the viewer with navigation aids or to simplify and reduce costs in video production and editing. The prior art typically identifies video clips automatically through analysis of changes in video or audio levels within a video sequence. More specifically, the boundaries of the 'highlight' video segment are typically identified using various super-histograms, frame signatures, cut detection methods, closed caption information, audio information, and so on, by analysing the visual, audio and transcript portions of the video signal. For example, based on the volume of audience cheers (U.S. Pat. No. 7,831,112) recorded in response to the performance of the athletes, or analysis of the area of the image depicting the score to detect changes (U.S. Pat. No. 7,983,442).

It is also known, for example from European Patent Application EP 1421780, to provide for a viewer to manually bookmark a 'highlight' for later access. Whilst the human input can be more reliable than analysis of the content, individual users will respond in different ways, and in particular will have different reaction times, ranging from an almost instant response to a voice or gesture command, or if the user has his finger poised over the appropriate control in expectation of an event, to several seconds if the user is less familiar with the system and/or needs to look for the control unit or, if it has multiple functions (such as a tablet computer) the relevant programme required to set up the bookmark. It is therefore difficult for a video retrieval processor to accurately determine which part of the content is appropriate to mark for a video clip in response to an individual bookmarking the content. Further variation can occur dependant on whether the event bookmarked is a "set piece", which users are expecting, or something unexpected for which there will be greater variation in response times.

The present invention provides a video service platform for generating video clips from a sequence of video data elements for delivery and playback on demand, comprising:
  a user input unit for receiving a plurality of individual time stamp data inputs, each generated by a respective user, identifying a part of the video data to be used to generate a clip,
  an aggregation system for calculating an aggregated time stamp value derived from the plurality of the individual time stamp data,
  an event marker unit for associating an event marker flag with an element of the video data sequence in accordance with the aggregated time stamp data,
  and an output unit for generating a video clip from a plurality of video data elements defined by relation to the event marker flag.

The invention also provides a method for generating video clips from a sequence of video data elements for delivery and playback on demand, wherein individual time stamp data inputs generated by each of a plurality of users identifying a part of the video data to be used to generate clips are aggregated to calculate an aggregate time stamp value, and associating an event marker flag with an element of the video data sequence in accordance with the aggregated time stamp.

The process for determining the aggregate time stamp value may be selected according to metadata associated with the individual time stamp values, and/or the distribution of time stamp data inputs. The distribution of time stamp data inputs may also be used to control the duration of part of a video clip before and/or after the event marker for that clip, for example by selecting a total duration time, or selecting the proportion of the clip that appears before the event marker.

The invention enables viewers to identify a number of key events within a video sequence (such as goals in a football match) using viewer-defined 'temporal bookmarks'. These bookmarks are stored as time-codes along with associated metadata which identifies the time-code as belonging to a certain type of event. In the preferred embodiment, instead of marking the beginning and end of a highlight clip, a first value marks a key event and a second value is used to define a ratio to identify the relative duration of the clip to be provided before and after the marked point. Thus the user does not need to identify the beginning of the build-up to the event itself. The actual duration can be adjusted whilst preserving this ratio.

A clip can be identified and generated easily and in real-time on a live video stream by a non-expert user through a single interaction at the moment of the key event. However, users may vary in the time they take to respond to the key event, either through unfamiliarity with the control device, variations in the time taken to realise the significance of the event, external distractions, etc. This can reduce the effectiveness of the system as different users will receive different clips, showing more or less of the events of interest. In particular, the clips would have to be long enough to ensure that the key moment (goal, catch, putt, overtaking manoeuvre, according to the sport in question), is caught, resulting in any clip delivered being likely to include more of the events leading up to, and/or following, the key moment than is desirable. This in turn means that fewer clips can be shown to a user in a given time.

A further disadvantage is that a very large number of event markers are stored. As well as causing a storage problem for the service provider, it makes retrieval difficult, especially if the clips are made available to viewers who did not see or bookmark the original broadcast, or parts of it, and wish to use the bookmarks to create a highlights sequence. Many of the bookmarks will relate to the same event and, without detailed analysis, it would be difficult for a user to identify which of the many bookmarks relating to an event will provide the most accurate view. Even for the users who created the bookmarks, their reaction times may vary from one mark to another which will result in the start and end points of some clips being earlier or later than is desirable.

The present invention overcomes this by analysing the temporal distribution of event markers generated by a plurality of users during a video transmission (which may be streamed live or may be being watched as an "on-demand" time-shifted recording), identifying event markers in close temporal proximity to each other, generating an aggregated time stamp, and generating an aggregate event marker having the value of the aggregated time stamp. The aggregated value may be a simple median value, or some earlier or later point in the distribution of the time stamps, such as the 25$^{th}$ percentile. Metadata provided by the users in conjunction with the event markers may be used both to initially identify event markers relating to the same event, and for determining which of a plurality of aggregation processes is to be used for each such group—for example it would be expected that the user's bookmarking action for a "set piece" such as a penalty shot, etc would suffer less scatter than for an unscheduled event such as collisions, goals from free play, etc.

A common approach to delivering video over HTTP (hypertext transport protocol) involves the dissection of large video files into multiple smaller files (called chunks), with each chunk corresponding to a segment of video perhaps a few seconds in length, and each with its own URL (universal resource locator). In such systems the a server platform provides a manifest file to the client, which specifies the URL of each chunk of the clip requested, so that the client can request, compile and then play back the video. In this embodiment the way the manifest file is created and interpreted by the client device so as to prioritise delivery of content based on its narrative importance, by downloading the chunks relating to the key events (such as goals) first, followed by further 'video chunks' in the sequence preceding and following each individual event. Different events may also be given different priorities, so that for example events such as goals are delivered first, with other events such as saved goals, fouls, etc delivered later. Chunks relating to the lower priority events may start to be delivered before delivery of all the chunks of the higher priority ones are complete, by prioritising the defining "event marker" chunk of a lower priority event ahead of chunks occurring some distance before and after the event markers of the high priority events. In any event, after delivery, the chunks are reassembled into their correct chronological order for viewing.

This arrangement enables 'highlight clips' to be provided in a flexible manner suited to the bandwidth available. This would be beneficial to viewers using low-capacity networks or those with unreliable coverage, for example as may be experienced by a mobile user. This arrangement would allow the number of individual highlight clips made available to the viewer to be optimised in the presence of restrictions in bandwidth availability or connection reliability. The prioritisation of video chunks would also enable video clips to be dynamically compiled 'on the fly' matched to specific playback length restrictions. This facility may be useful when providing 'late-corner' catch-up facilities which would enable the viewer to be provided with a synopsis of key events which took place prior to joining the live stream.

BRIEF DESCRIPTION OF THE DRAWINGS

An embodiment of the invention will now be described, by way of example, and with reference to the drawings, in which.

DETAILED DESCRIPTION OF PRESENT EXAMPLE EMBODIMENTS

Figure 1:
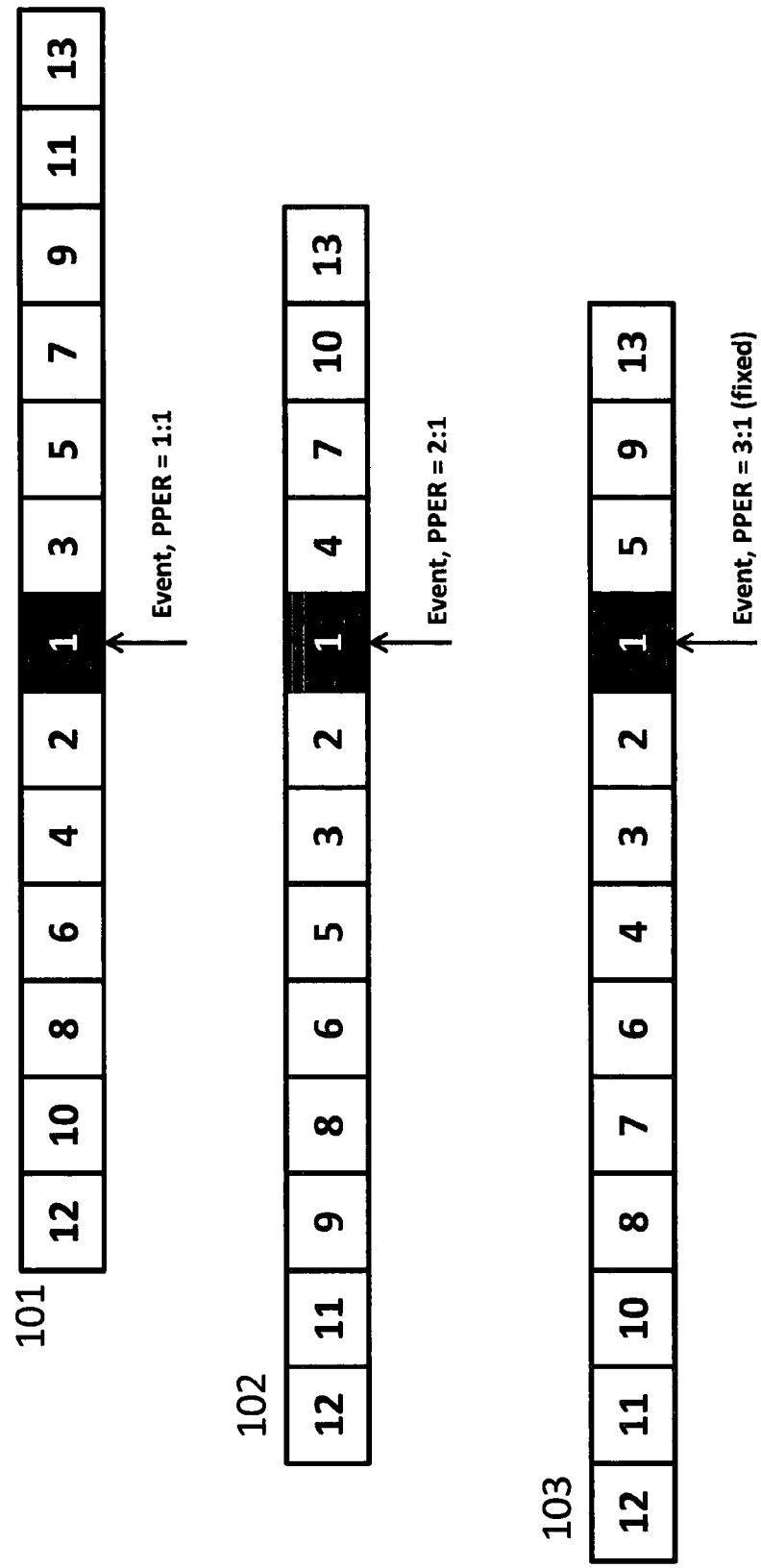
FIG. 1 depicts a number of different video clips created according to the invention.
Figure 2:
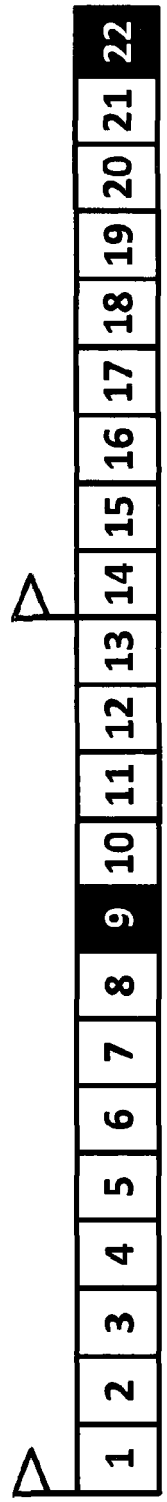
FIG. 2 depicts a conventional download sequence for a series of clips

It should be noted that the numbers 1, 2, . . . 133 etc in FIGS. 1 and 3 are priority levels, indicating the order in which the video chunks may be delivered to the client, or the (reverse) order in which the chunks should be dropped if a shorter sequence is to be compiled. For example, if each chunk is 1 second in length, there are 6 clips each with equal importance and PPER, and the desired playback duration is 60 seconds, then the playback sequence should only be assembled from chunks with a NIV of 10 or less (60/6). In high bandwidth situations these can be downloaded chronologically In particular note that in FIG. 3 more than one chunk has the same priority level. In FIG. 2 the numbers indicate the (different) order in which they are to be presented—that is, in chronological order of the events they depict.

In the embodiment, a number of mechanisms are used to enable viewers to 'bookmark' events in sports TV programmes, and to enable service providers to utilise these bookmarks in the identification, delivery and provision of video highlight clips. The mechanisms outlined include:

Creation of a video bookmark and definition of a video 'highlight' clip. (FIG. 6)

Mechanism to deliver and compile video clips using a prioritised delivery schedule. (FIG. 4)

Creation of a video bookmark. (FIG. 6) A viewer can identify key events (such as goals) within a video sequence and mark them using 'temporal bookmarks'. These 'temporal bookmarks' can then be used by the viewer to navigate easily back to their favourite moments in the video sequence. Bookmarked events are stored as time-codes along with associated metadata provided by the viewer to classify the event. The metadata enables the individual video chunks to be prioritised for delivery and presentation by the video service provider.

Figure 4:
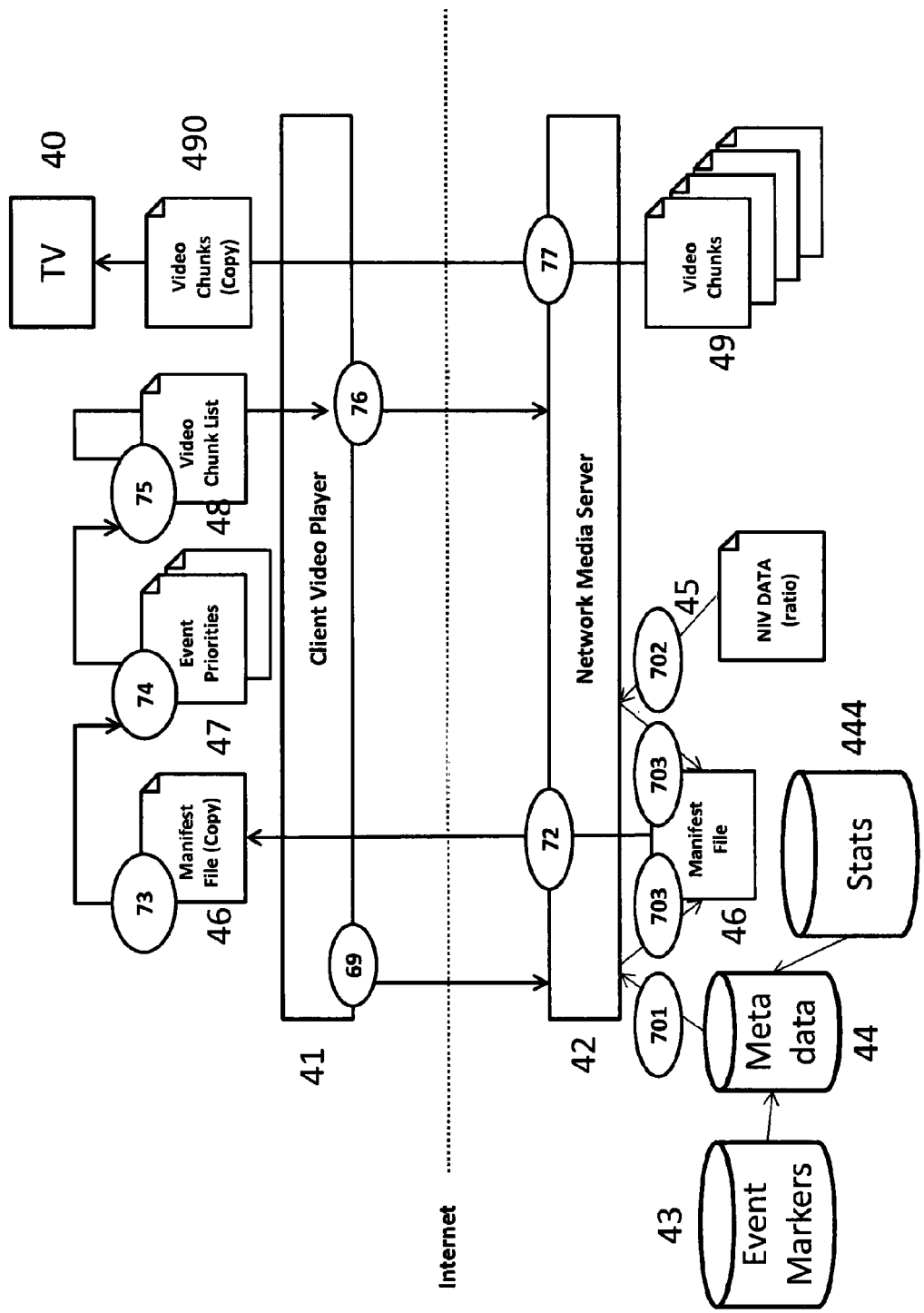
FIG. 4 depicts a media server and client server arranged to operate according to the invention, and also depicting the process used to compile video data into a clip sequence.
Figure 6:
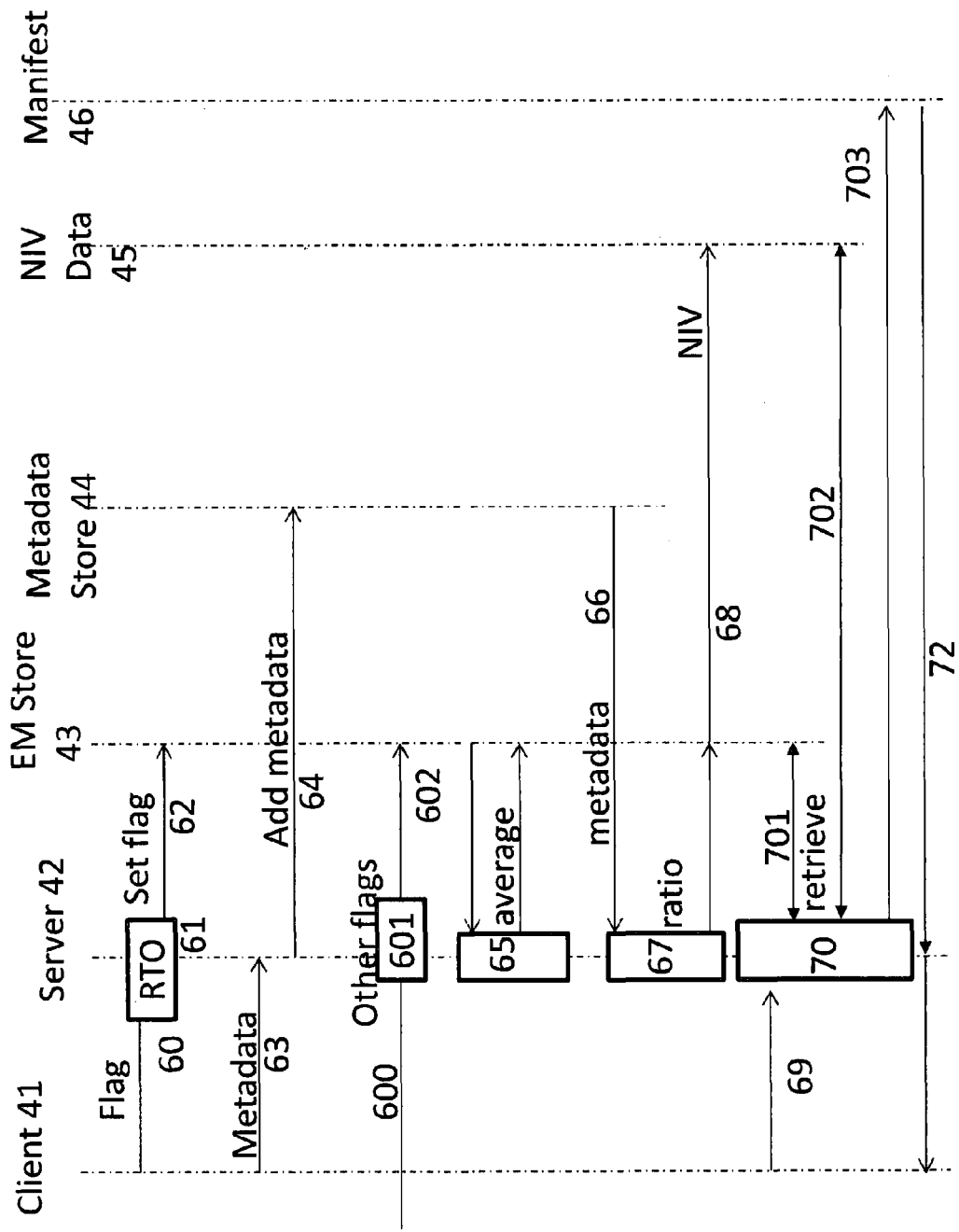
FIG. 6 is a flow diagram illustrating the processes performed in the operation of the invention

As shown in FIGS. 4 and 6, the viewer uses a video device 40 such as a television set to view broadcast or recorded video content such as coverage of a sports event. For ease of use the viewer may also be using a tablet device 41 or other terminal onto which has been loaded an application ("App"). A number of such applications are available which can synchronise such a terminal to the output of a video device 40 linked to a server 42 so that the server can monitor the content being watched by the viewer. The server also has data related to the content being watched. For example for a football match, it would have data on the identities of the teams and individual players. The App provides a user interface that enables the viewer to bookmark the video stream and add metadata to that bookmark.

The application loaded on the tablet device 41 allows a user to bookmark events in the television content and add metadata relating to that event, to be stored on the server 42. This enables the user to locate the event in order to share a video clip of it with other users using a social network, or to review the clip again after the event, or participate in a vote or competition which requires the nomination and submission of a clip.

The viewer 'bookmarks' the event by first selecting an action (goal, corner, etc). This creates an "event marker" The event marker is then saved to the server after metadata items, for example identifying the sportsperson involved) have been added This bookmarking process is identified collectively as step 60 in FIG. 6. Each event is identified using a single point in time within a video sequence, referred to herein as an Event Marker (EM). The EM would typically identify the exact moment of the event of interest, for example when a ball crosses the goal mouth, or the moment a bad tackle was committed. Each EM is specified by a time-code, frame or video chunk identifier within a video sequence.

The viewer may also provide additional metadata associated with the bookmark (step 63). This would include further information such as the type of event—(goal, pass, shot on goal, save, corner, red card, etc), the main primary person associated with the event—(Footballer, Referee, Manager, linesman, etc), and comments or descriptions the viewer may wish to add to the event to support later retrieval or to add context to the video clip.

Such metadata can also be created automatically to simplify the bookmark creation process. For example, using other data sources 444 (for example the real-time data feed provided by OPTA Sports Ltd) it would be possible for the system to provide data on which player had possession of the ball when the 'save bookmark' button was selected by the viewer.

The event markers and additional metadata are recorded in associated XML files 43, 44, (steps 62, 64) typically stored in association with the server device 42 so as to be accessible to both the viewer's Local Area Network and the video service provider.

There may be a mismatch between when the event actually occurred and when the user pressed the 'save bookmark' button. This mismatch can be reduced using either or both of the following methods.

The server 42 can modify the bookmark time-code by using a user-specific Reaction Time Offset value (RTO), (step 61) which attempts to minimise differences between when the event actually occurred and when the viewer indicated it occurred. The RTO for each user can be calculated by using reference video content in which event markers have previously been identified. The average difference between time-code for a reference event marker and the time code of the equivalent event marker identified by a viewer can be used to calculate a user's RTO. In FIG. 6 this process 61 is depicted as being performed by the server platform 42, but it could be done by the client device 41.

The bookmark time-code can be further improved through comparison with bookmarks (600, 601, 602) created by other viewers. By identifying a significant number of bookmarks saved by viewers relating to the same event (as identified by metadata applied by the users, or simply by chronological proximity to each other), and calculating a single representative value from them, a more accurate time code for an event marker can be calculated (step 65). This time-code adjustment process would take place on the server's centralised bookmark store 42 and returned to the event marker store 43.

Figure 7:
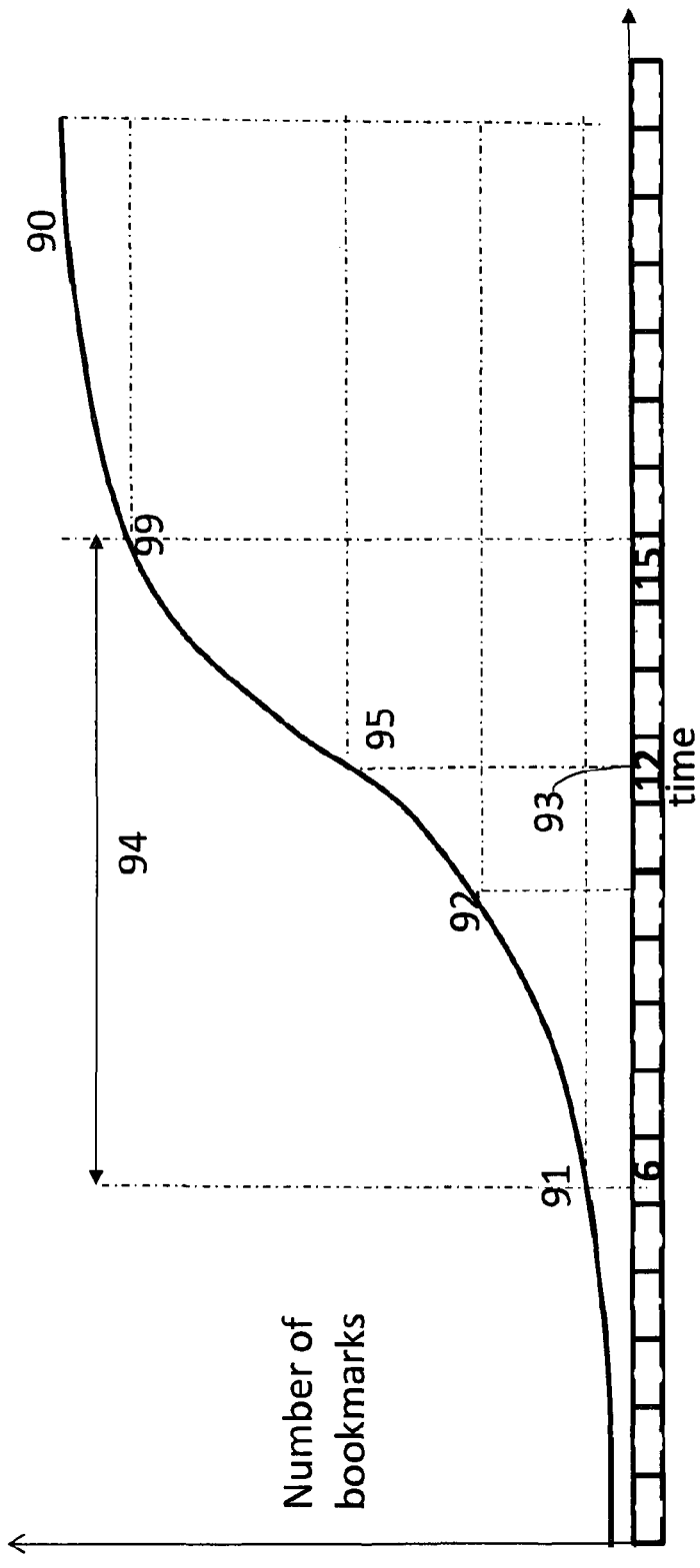
FIG. 7 is a diagram illustrating the capture of bookmark data.

An example of this process can be understood with reference to FIG. 7. The curve 90 represents the cumulative total over time of bookmarks 60, 600, 601, 602 etc transmitted by different users in relation to a single event, and identified as relating to the same event by comparison of the metadata 63 associated with them. The details of the shape of the distribution of bookmarks over time will vary somewhat depending on the type of event being flagged. Empirical systems may be used to estimate, using the shape of the distribution 90 and the metadata 64 supplied by the users bookmarking the data, the optimum time to place the event marker 93. For example the event marker can be defined as a predetermined percentile of the bookmark times—for example the first quartile ($25^{th}$ percentile) 92, or the median ($50^{th}$ percentile) 95, depending on the type of event being bookmarked. The spread 94 of data may also be used to determine an appropriate PPER to apply.

In the example depicted in FIG. 7 the event marker is at the median point, which is chunk 12. As described above, the EM and PPER determine the order in which he chunks are to be delivered—the point at which the sequence is terminated is determined by the receiving system.

In this preferred embodiment the chunks to be selected for the clip are determined by an event marker 93 and associated ratio PPER, but the invention may also be used to select the timing of clips defined conventionally, using start and end times specified by reference to the distribution of bookmarks—for example from the first decile ($10^{th}$ percentile) 91 (chunk 3) to the ninth decile ($90^{th}$ percentile) 99 (chunk 15).

The refined or aggregated bookmark is added to a bookmark list available to the application stored on individual client devices 41. Users may be given the option of using their own markers instead of the aggregated values. Bookmarks saved in the XML file are automatically uploaded to a centralised data store. The central data store can be used by viewers and TV production to identify and prioritise video clips for use in other applications such as a TV sports highlights programme.

The bookmark list available to an individual viewer can include bookmarks to which he has not himself contributed—for example he may have missed an incident because of interruptions in the data connection over which he was viewing live coverage. By using a value aggregated from all those who did see the coverage the user can obtain a more reliable event marker than if he relied on any individual event marker.

The bookmark list can be filtered using the metadata tags, thereby enabling easy navigation and replay of video clips. Bookmarks can also be used as playlists, for example to enable a viewer to see all the goals within the match they have added to their bookmark list.

The bookmark (or Event Marker) "93" only defines a specific moment in time, around which a 'clip' can be defined. By dissecting large video files into multiple smaller files (called chunks), each being for example two seconds in length, a video clip can be defined by the number of chunks that occur before and after the Event Marker.

The chunks to be selected are determined with reference to two other properties. Firstly, a ratio before and after a single event time-code is determined (step 67) in accordance with metadata retrieved from the store 43 (step 66). This ratio is referred to herein as a Pre Post Event Ratio (PPER). The PPER determines the position within the clip of the time specified by the event marker—more specifically the ratio between the number of "chunks" to be provided preceding the EM and the number of "chunks" to be provided subsequent to the EM.

FIG. 1 shows three clips 101, 102, 103, each of thirteen "chunks" but with PPERs of respectively 1:1, 2:1 and 3:1. It will be seen that although in each case the clip has the same duration, the event marker (labeled as "1" in each case) occurs as—respectively, the $7^{th}$, $9^{th}$ or $11^{th}$ chunk in the sequence, and thus the start and finish times of these clips differ.

Different sports and sports-specific events would typically have different PPERs. Analysis of professionally created video clip sequences has identified average values for PPERs for the following sports:

Association Football has an average PPER of 1:3
Formula1 motor racing has an average PPER of 1:6
Rugby Football has an average PPER of 2:1

However, different ratios may be applicable to different levels at which the sport is played eg. local league, national league and international level, both because of the different levels of proficiency and the different audiences. Different PPERs may also apply to different events (goals, rule infringements etc) within a game, in particular according to the relative importance of the build-up to the key moment, and the consequences of that moment. In the case of set pieces, users may modify the bookmark after the event depending on the outcome (e.g "hit" or "miss"), which may also affect its significance. The metadata stored (44) with the bookmark time (43) can be used to determine whether the instant the event is bookmarked is likely to be towards the beginning of the event of interest, or towards the end.

The value determined for the PPER ratio is used to generate a set of Narrative Importance Values (NIV) (step 68) for the individual chunks in a clip, which are maintained in a store 45.

The actual length of the clip, and therefore the start and end times of that clip, are not defined until a client device requests delivery of a video clip, as will be explained with reference to FIGS. 2, 3 and 6.

When a clip is requested by a user (step 69 and FIG. 4) a manifest file 46 is created within the network video server 42 (step 70) by retrieving the event markers 43 associated with the clips requested, and determining the network addresses of the individual video chunks to be delivered and their associated narrative importance values (NIV) 45 (steps 701, 702). The manifest file 46 is delivered to a client 41 requesting a clip (step 72), allowing the client to request the video chunks in order of their narrative importance value (step 76).

Delivery and Compilation of Video Clips Using the Prioritised Delivery Schedule (FIG. 4)

As shown in FIG. 1, the PPER can be used to specify in which order the video chunks are to be downloaded for a PPER of 1:1, 2:1 and 3:1 respectively. The Event Marker would always be identified as chunk number 1. As shown, the PPER would be used to identify the Narrative Importance Value (NIV) for each video chunk, which would then be used by the server to generate a video manifest file 46 which specifies the order in which individual video chunks would be requested by a client device video player application. So, for example, with a PPER of 1:1, chunks will be allocated NIVs in descending order at the same rate both before and after the event marker. For a PPER of 2:1 two chunks will be allocated before the EM for each chunk afterwards. Similarly for a PPER of 3:1—three chunks are downloaded preceding the EM for each one following it. In each case the chunks are downloaded in order beginning with the EM and proceeding chronologically away from it—this means that chunks that precede the EM are delivered in reverse order, requiring buffering until the sequence is complete or the download terminates.

The result is that, however many chunks are downloaded, the ratio specified by the PPER is preserved as nearly as possible. It will be seen from the examples that although in each case the clip has a duration of 13 chunks, (e.g 26 seconds) the event marker occurs at different points within it—respectively, the $7^{th}$, $9^{th}$ or $11^{th}$ chunk in the sequence. Similarly, if the sequence is truncated before delivery is complete, the ratio specified by the PPER is preserved as nearly as possible given the fundamental granularity of the chunks (i.e that fractions of chunks are not possible).

FIG. 4 illustrates the server and client apparatus which co-operate to perform the process, and the exchanges of data required. FIG. 4 depicts a client device 41 having an output to a television set 40 or other monitor device, and a connection over a communications network to a server 42. The server has a number of data stores 43, 44, 45, 46 which store event markers and other metadata associated with the video data, and manifest files for specifying which parts of the video data are to be delivered to individual clients, and in what order. The manifest files 46 may be created in response to specific requests from clients, or may be pre-prepared.

The client server 41 has a corresponding store for downloaded manifest files 46, and may also have a store of personalised priorities 47 for modifying the manifest file in order to prepare a request 48 for delivery of video content. The server platform 42 has a store of video content 49 from which is retrieved the content 490 specified in the request 48 for delivery to the client device 41.

When requesting a videoclip, the user selects an identity (e.g by reference to its bookmark EM) and a desired duration (step 69). He may select a single clip or a series, defined either one-by-one or as a compilation defined by the user himself or by another user. In the case of a compilation the user may specify its overall duration, rather than the individual durations.

The length of the clip, or of each clip in the sequence, is defined by the receiving client device 41 which orchestrates the request of clips and the composition of a multi-clip video sequence for presentation.

If the clips are to be made into a compilation such as a "Highlights" show, the server uses the bookmark data associated with each event marker to determine a priority list. This list may be tailored towards the user's preferences—for example in a football game the user may give priority to viewing goals scored for the team he supports rather than those scored for the opposition, and may prioritise goals over other incidents such as events surrounding a caution or dismissal of a player.

The steps in the delivery process are as follows:
The client 41 requests a particular manifest file 46 from the server 42 (step 69), specifying one or more individual clips If not previously defined, the manifest file is compiled from the EM and NIV data (step 70—FIG. 6)

The server 42 delivers the manifest file 46 to the client 41 (step 72)

The Client 41 reads the manifest file 46 (step 73)

The client 41 interprets the manifest file 46, and applies the client's own Event and Personal Priorities 47 (step 74)

The client 41 creates a modified prioritised video chunk list 48, derived from the manifest file 46 as modified by the priorities 47 (step 75) specifying the video chunks in the order they are to be transmitted.

The client 41 transmits the chunk list 48 to the server 42 (step 76)

The server 42 retrieves the video chunks 49 and transmits them in the order specified in the request (step 77)

The client receives the video chunks 49 and reassembles them into chronological order for presentation to the user (step 78). In the event that not all the chunks are delivered 49, for example, because connection between the client 41 and server 42 is broken, the client device 41 assembles a shorter sequence from those it has received. All the chunks are stored, either for later playback or for near-immediate display: however, because the chunks preceding each event marker are delivered in reverse order to the order in which they are to be shown, display of the full sequence cannot start until all the pre-event chunks of the first clip have been delivered.

FIG. 2 illustrates how video chunks would be typically assembled by a client device to form a compilation of video sequences, in this case two video sequences 1-13 and 14-22. In this figure, the chunks are numbered in the order they are to be displayed. The flag icons indicate the divisions between the individual video clips. The chunks selected will be those which satisfy the required duration, ratio and EM. Thus the first sequence (1-13) has a ratio of 2:1 and a duration of 13, and the second a duration of 9 chunks and a ratio of 1:0 (i.e the EM is to be the last chunk of the sequence, however long it is). On receipt of the chunks, the user device composes them into a set of video clips which together create a complete video 'highlights' show.

However, according to the invention, each chunk is allocated a value referred to herein as its NIV (Narrative Importance Value) and the order the chunks are delivered is determined in accordance with their individual NIVs. The order in which the chunks are delivered is therefore, in general, different from that in which they are to be assembled.

Figure 3A:
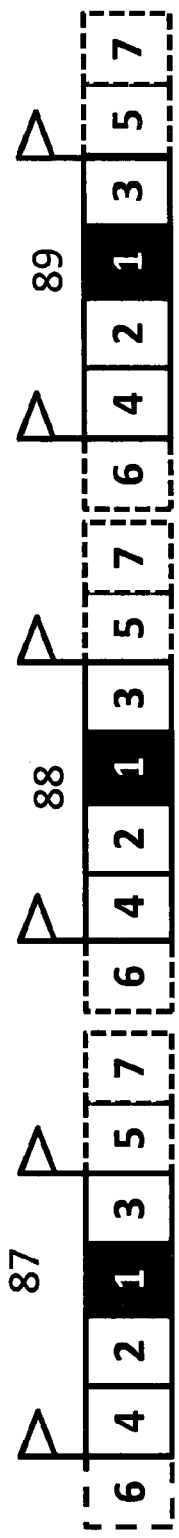
FIGS. 3A, 3B and 3C depict the download sequence for a series of clips according to the invention, for different download conditions.
Figure 3B:
Figure 3C:
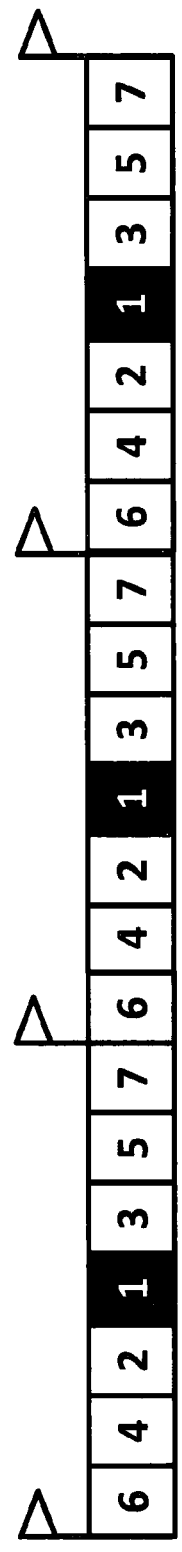

FIGS. 3A, 3B and 3C illustrate how video chunks can be downloaded across multiple video clips in sequence. In this example the client device has requested a manifest file suitable for 'transient networks' where network connection cannot be guaranteed. Here the manifest file specifies an ordering of video chunks, relating to several video clips. In this example each clip has the same duration (7 chunks) and PPER ratio (1:1), but the principle can be extended to compilations of clips in which these values differ. This approach enables the key highlights to be prioritised.

In these figures the individual chunks are numbered in order of priority, and it is in that order that they are downloaded. Thus the server will first deliver the EM chunk from each clip (labeled "1"). When all the "1" chunks have been delivered, all the "2" chunks will be delivered, and so on.

FIG. 3A shows a partially downloaded video sequence compiled from three video clips (87, 88, 89). If the download were interrupted after only twelve chunks had been delivered a video sequence comprising three short clips 87, 88, 89 could be compiled by the player 41, and presented to the user. If the server 42 had instead delivered the chunks in the sequence in which they are to be played, an interruption after twelve chunks would result in the viewer only receiving, and being able to view, the entire first clip and part of the second, but nothing of the third clip.

Similarly, if the client application specifies a download of 24 seconds of video content, the client platform would stop the download after delivery of the highest priority four chunks (those with NIVs of 1,2,3, or 4) from each of the three video clips 31, 32, 33.

FIG. 3C shows the fully downloaded video sequence, if all the chunks were downloaded.

There are several uses to which this limitation process can be put. Mobile data users in areas of poor coverage may wish to prioritise data to ensure that the key moments are downloaded before connection is lost. A user on a pay as you go system, for example a mobile data user, may also wish to restrict the length of clip compilations in order to stay within his data access budget. One potential application of the invention is in the provision of highlights used in a catch-up facility for 'late comers' who have missed the start of a sports match, but are keen to see a précis of the key moments they have missed before watching the rest of the match in real time. In this case the download duration can be set to a predetermined period, but the number of clips to be inserted will depend on how many events have been bookmarked (by other viewers) up to that point. The duration of the "catch-up" download may be determined to be dependent on the amount of the video that has already been shown, in order that the end of the 'catch-up sequence' coincides with the return to watching the live match. Any further event that is bookmarked during the actual download time can be added to the sequence "on the fly", the high-priority chunks from the additional clip displacing the lowest priority chunks from earlier clips, that would otherwise have been downloaded last, in order to keep the total time of the catch-up sequence the same, so that the end of the 'catch-up sequence' coincides with the return to watching the live match.

This invention would enable the dynamic delivery of a compilation of predetermined length without having to pre-define the number of clips in the compilation, and even adding further clips to the compilation as the download progresses without changing the overall duration of the compilation.

Although as shown in FIG. 4 the chunks corresponding to each clip's respective event marker (EM) all have the same priority, this can be adjusted if the metadata associated with the EMs indicate that one clip is more important than another. So for example the EM of one clip may have priority "4" and another priority "1", so that four "chunks" of the second clip are downloaded before any chunks of the first.

For example, clips may be provided with a priority descriptor to be used by the server to define how video chunks may be prioritised within the manifest file. Such priorities may be determined according to several criteria, such as using the volume of bookmarks associated with an event to understand the level of importance and thereby change the priority and provision of individual video chunks (referred to herein as "Social priority").

Also, individual clients can interpret the manifest file and tailor their requests to the server to match the individual needs of the device and the preferences of the user. For example an event description (goal, pass, foul, etc.) can be used to prioritise delivery of the clip e.g. events such as goals would be higher priority than fouls.

Ratings and the level of comments made about events may also be used to influence priority (referred to herein as "Event priority"). Using the personal preferences of the viewer such as which team they support, the delivery of video clips can be further prioritised according to those preferences, for example by omitting, or curtailing, clips relating to their opponents.

Figure 5A:
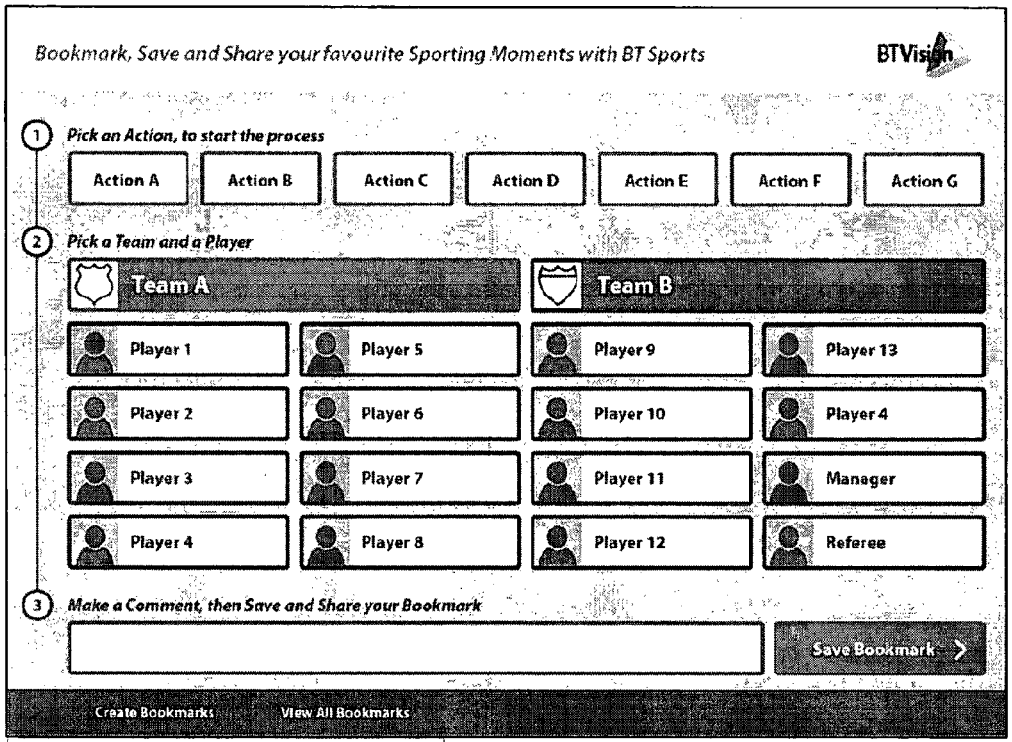
FIG. 5A depicts a display for use in creating bookmark metadata
Figure 5B:
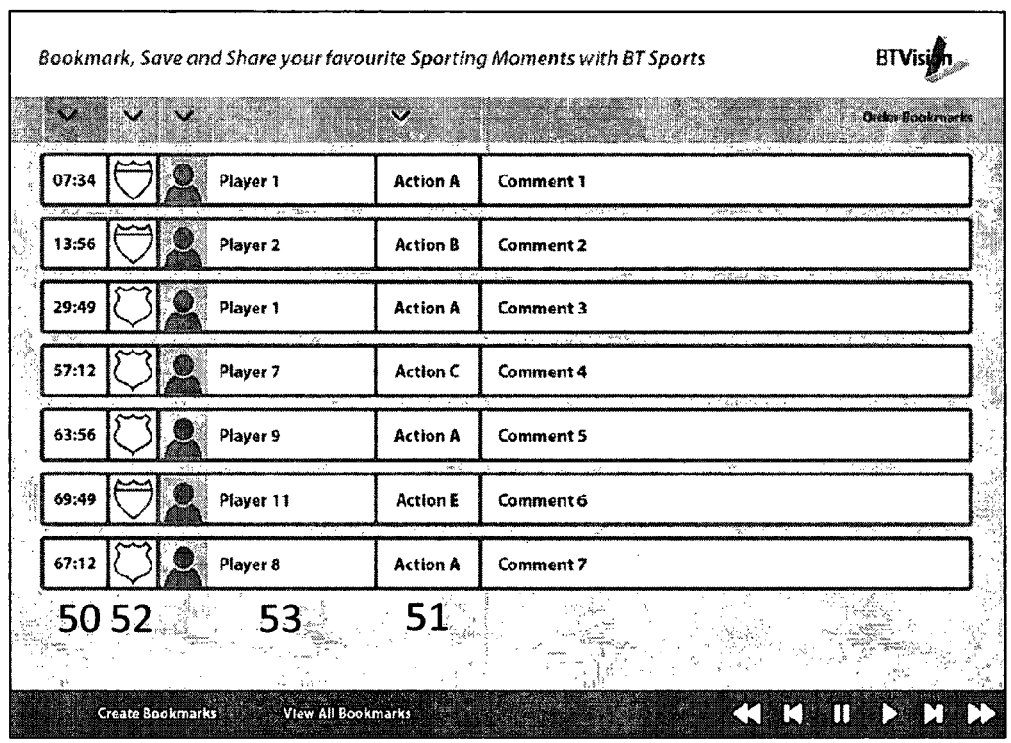
FIG. 5B depicts a display for use in navigating the bookmark metadata and playing back video clips

FIGS. 5A and 5B show the layout of a companion screen application to be used by the viewer. FIG. 5A shows the user interface to create temporal bookmarks. Having first called up the bookmark screen (which causes the time to be recorded) the user can then select an event type from a first menu 51 and other metadata (e.g team 52, or individual player 53) to be stored in the metadata store 44 associated with the event marker 43.

FIG. 5B shows the user interface to navigate bookmarks in order to compile a video clip sequence. Individual event markers 50 are displayed in association with the metadata 51, 52, 53 recorded with them, with the facility to select one or more such events for download, for example by scrolling through the events and operating a select function for those required.

Individual event markers 50 are displayed in association with the metadata 51, 52, 53 recorded with them, with the facility to select one or more such events for download, for example by scrolling through the events and operating a select function for those required.

What is claimed is:

1. A video service platform for generating video clips from a sequence of video data elements for delivery and playback on demand, comprising:
    a user input unit for receiving a plurality of individual time stamp data inputs, each generated by one of a plurality of respective users through a respective one or a plurality of user interfaces in response to a same event, identifying a part of the video data to be used to generate a clip,
    an aggregation system for calculating an aggregated time stamp value derived from the plurality of the individual time stamp data,
    an event marker unit for associating a single event marker flag with an element of the video data sequence in accordance with the aggregated time stamp value, and
    an output unit for generating a single video clip from a plurality of video data elements defined by relation to the single event marker flag.

2. A video service platform according to claim 1, having a metadata processor for receiving metadata associated with the individual time stamp data, the aggregation system being controlled such that a process for calculating aggregated time stamp values is dependent on the associated metadata.

3. A video service platform according to claim 1, having a processor for determining the distribution of time stamp data inputs, and the aggregation system being controlled such that a process for calculating aggregated time stamp values is dependent on the distribution of time stamp data inputs.

4. A method for generating video clips from a sequence of video data elements for delivery and playback on demand, the method comprising:
    aggregating individual time stamp data inputs, generated by each of a plurality of users through a respective one of a plurality of user interfaces in response to a same event, identifying a part of the video data to be used to generate clips to calculate an aggregated time stamp value,
    associating a single event marker flag with an element of the video data sequence in accordance with the aggregated time stamp, and
    generating a single video clip from a plurality of video data elements defined by relation to the single event marker flag.

5. A method according to claim 4, wherein a process for determining the aggregated time stamp value is selected according to metadata associated with the individual time stamp values.

6. A method according to claim 4, a process for calculating aggregated time stamp values is dependent on the distribution of time stamp data inputs.

7. A method according to claim 4, wherein calculating the aggregated time stamp value includes determining a median of time values of the individual time stamp data inputs.

8. A method according to claim 4, wherein
    calculating the aggregated time stamp value includes determining a predetermined percentile of time values of the individual time stamp data inputs, the predetermined percentile depending on a type of event in the video data being bookmarked.

9. A video service platform according to claim 1, further comprising a processor configured to calculate an aggregated time stamp value by determining a median of time values of the individual time stamp data.

10. A video service platform according to claim 1, further comprising a processor configured to calculate an aggregated time stamp value by determining a predetermined percentile of time values of the individual time stamp data, the predetermined percentile depending on a type of event in the video data being bookmarked.

11. A method for generating video clips from a sequence of video data elements for delivery and playback on demand, the method comprising:
    aggregating individual time stamp data inputs, generated by each of a plurality of users identifying a part of the video data to be used to generate clips, to calculate an aggregated time stamp value; and
    associating an event marker flag with an element of the video data sequence in accordance with the aggregated time stamp;
    wherein calculating the aggregated time stamp value includes determining a predetermined percentile of time values of the individual time stamp data inputs, the predetermined percentile depending on a type of event in the video data being bookmarked.

12. A video service platform for generating video clips from a sequence of video data elements for delivery and playback on demand, comprising:
    a user input unit for receiving a plurality of individual time stamp data inputs, each generated by a respective user, identifying a part of the video data to be used to generate a clip,
    an aggregation system for calculating an aggregated time stamp value derived from the plurality of the individual time stamp data,
    an event marker unit for associating an event marker flag with an element of the video data sequence in accordance with the aggregated time stamp value,
    an output unit for generating a video clip from a plurality of video data elements defined by relation to the event marker flag, and
    a processor configured to calculate an aggregated time stamp value by determining a predetermined percentile of time values of the individual time stamp data, the predetermined percentile depending on a type of event in the video data being bookmarked.

* * * * *